United States Patent [19]
Weaver

[11] Patent Number: 6,155,191
[45] Date of Patent: Dec. 5, 2000

[54] MARINE CLEAT BRACKET

[76] Inventor: Dennis M. Weaver, 163 McLean Rd., Weaverville, N.C. 28787

[21] Appl. No.: 09/330,492

[22] Filed: Jun. 11, 1999

[51] Int. Cl.[7] .................................................. B63B 21/04
[52] U.S. Cl. ..................... 114/218; 114/343; 114/364; 114/382; 248/158; 248/508
[58] Field of Search ..................................... 114/218, 343, 114/364, 221 R, 382; 248/121, 175, 158, 508, 509

[56] References Cited

U.S. PATENT DOCUMENTS

| | | |
|---|---|---|
| 1,427,260 | 8/1922 | Catlin . |
| 3,504,108 | 3/1970 | Kihs . |
| 3,722,844 | 3/1973 | Baker . |
| 3,740,012 | 6/1973 | Millen . |
| 4,722,501 | 2/1988 | Ruhl . |
| 5,651,521 | 7/1997 | Aberg . |
| 5,673,835 | 10/1997 | Kalat . |

*Primary Examiner*—S. Joseph Morano
*Assistant Examiner*—Ajay Vasudeva
*Attorney, Agent, or Firm*—Carter & Schnedler, P.A.

[57] ABSTRACT

A bracket is provided for use with a marine cleat which may be attached to a boat. The bracket is in the form of a rod having first and second ends. The first end of the rod is bent into a Z shape or S shape configuration for engagement with the marine cleat so that the rod is secured to the cleat. The second end is adapted to receive an accessory, such as a lantern.

13 Claims, 2 Drawing Sheets

MARINE CLEAT BRACKET

BACKGROUND OF THE INVENTION

This invention relates to brackets for use in marine applications for supporting an accessory, such as a lantern or a fishing rod holder. More particularly it relates to brackets which may be conveniently secured to a standard marine cleat.

While fishing at night from a boat, the fisherman will often want to extend a lantern off the side of the boat and over the water to attract fish. Fishermen have tried many different techniques to extend a lantern off the side of a boat, including hanging the lantern on one end of a pole and wedging the other end of the pole under an article on the hull, or simply hanging the lantern against the outer hull. However, particularly when the water is rough, the lantern will often beat against the side of the boat, causing noise which actually scares the fish, and also potentially causing damage to both the boat and to the lantern. Thus there is a need for a bracket for securely holding a lantern over the side of the boat, but away from the boat so that the lantern will not come in contact with the outer hull.

OBJECTS OF THE INVENTION

It is therefore one object of the invention to provide an improved bracket for supporting marine accessories, such as lanterns and fishing rod holders.

It is another object of the invention to provide a inexpensive and easy to use apparatus for providing support for marine type accessories on a boat or on another platform adjacent to the water, such as a dock.

It is still another object of this invention to provide an apparatus which may be attached to a standard marine cleat for supporting marine type accessories.

SUMMARY OF THE INVENTION

In accordance with one form of the invention, there is provided a bracket for use with a marine cleat. The bracket is in the form of a rod having first and second ends. The first end is formed into a configuration for engagement with a marine cleat, wherein the rod is secured to the cleat. The second end is adapted to receive an accessory, such as a lantern or a fishing rod holder. Preferably, the configuration of the first end of the rod is a Z shape and is adapted to be threaded into the openings and recesses of a marine cleat. It is also preferred that the second end of the rod include a substantially straight portion which is connected to the Z shaped first end. It is preferable that the straight portion projects away from the Z shaped first end at an angle greater than 90° to provide greater stability.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 1:
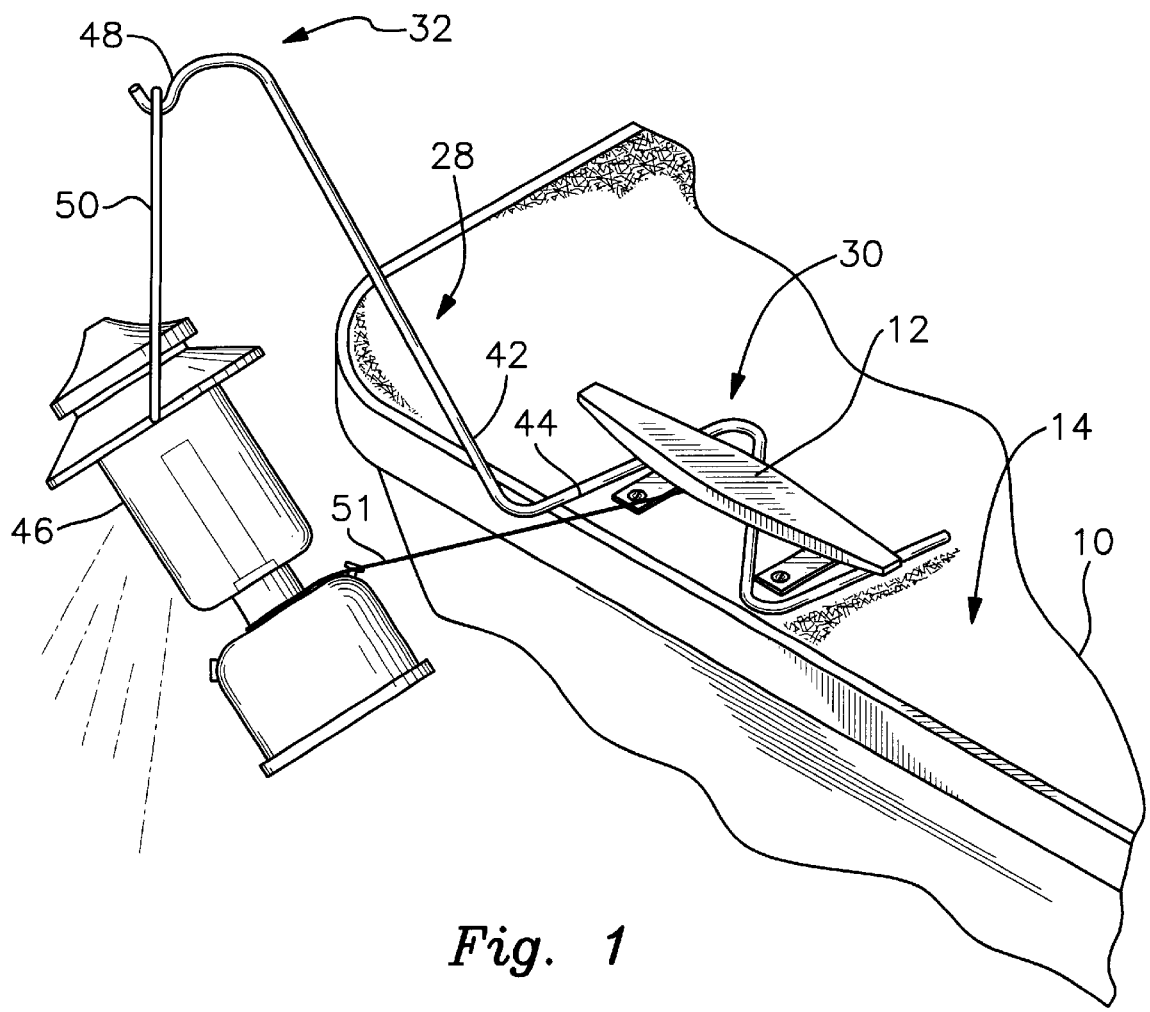
FIG. 1 is a perspective view showing a part of the side of a boat having a standard marine cleat affixed thereto with the bracket of the subject invention connected to the cleat and with the bracket supporting a lantern.

Referring now more particularly to FIGS. 1–4, there is provided platform 10, which preferably is a boat, having a standard marine cleat 12 mounted to surface 14 by screws 16 which are received in the holes in feet 18 and 19 of cleat 12. Cleat 12 includes bar 20 which is elevated from surface 14 by feet 18 and 19. Bar 20 and feet 18 and 19 form overhang ends 22 and 24 and middle opening 26.

Bracket 28 is in the form of a rod and includes first end 30 and second end 32. The first end 30 is formed into a configuration for engagement with marine cleat 12.

In the preferred embodiment, the first end 30 of bracket 28 is Z shaped or S shaped so that the first end 30 may be easily threaded into the marine cleat. In the embodiment shown in FIGS. 1–4, the first end 30 is Z shaped.

Figure 2:
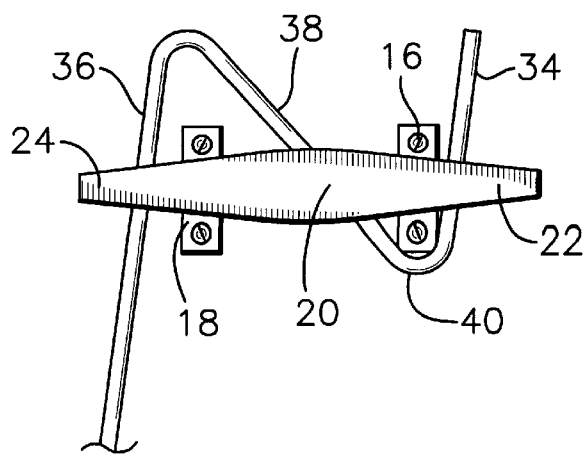
FIG. 2 is a top view showing one end of the bracket of the subject invention shown in FIG. 1 connected to the marine cleat.
Figure 3:
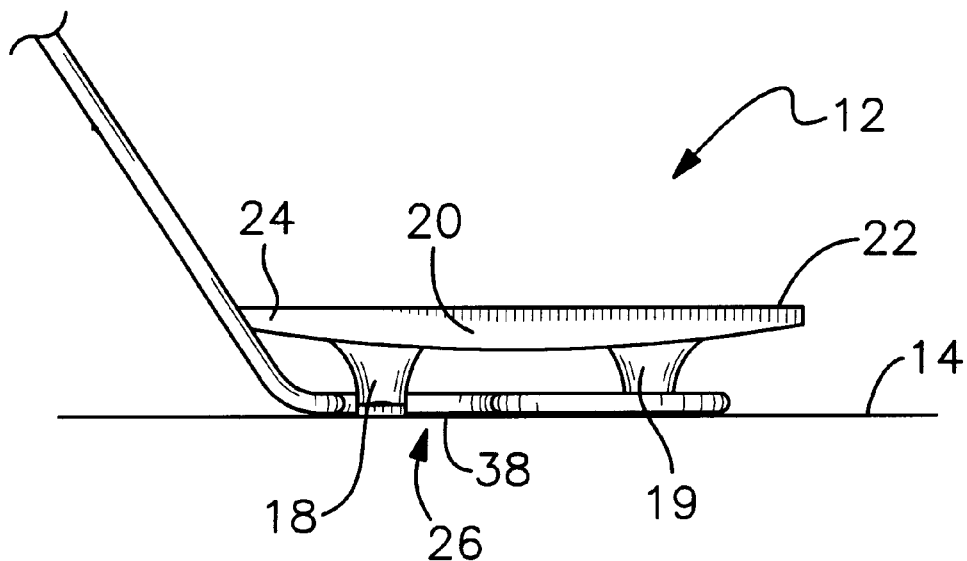
FIG. 3 is a side elevational view of the apparatus of FIG. 2.

The configuration of the first end 30, shown in FIGS. 1–3, includes first leg 34 and second leg 36 which are substantially parallel to one another. Middle leg 38 connects the first leg 34 and the second leg 36 together diagonally. A portion of the first leg 34 is received under first overhang end 22 of cleat 12 and a portion of the second leg 36 is received under second overhang end 24 of cleat 12. A portion of the middle leg 38 is received in opening 26 of cleat 12. At least a portion of second leg 36 makes contact with surface 14. The middle leg 38 and the first leg 34 are joined together by a bend 40. The bend 40 also makes contact with surface 14.

The second end 32 of bracket 28 includes a substantially straight portion 42 which is connected to the Z shaped first end 30 at bend 44. When the bracket 28 is used to support lantern 46, the angle of bend 44 is greater than 90° and preferably is approximately 135°. Thus the straight portion 42 projects away from the first Z shaped end 30 at an angle greater than 90° when a lantern is the accessory. In the lantern holder version, second end 32 of bracket 28 includes a partial loop or hook 48 which receives lantern handle 50. The weight of the lantern on hook 48 will cause the bracket to be more firmly secured to cleat 12 because the legs 34, 36 and 38 of the Z shaped first end 30 will be forced upwardly against bar 20 of the cleat, while leg 36 and bend 40 will be pressed firmly against surface 14. A rope 51 may be used to attach the bottom of lantern 46 to cleat 12 to stabilize lantern 46.

Figure 4:
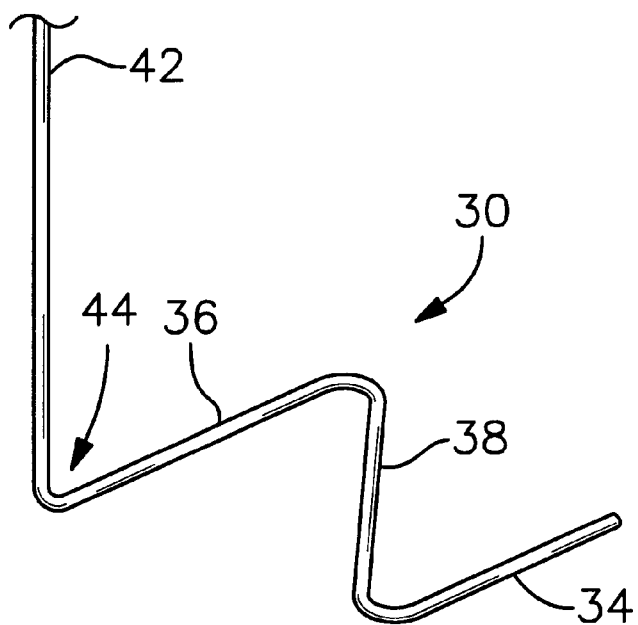
FIG. 4 is a perspective view showing the fishing rod holder version of the subject invention onto which various manufacturers' brackets would be attached to accommodate various manufacturers' rod holders.

When the accessory is a fishing rod holder, which is shown in the embodiment of FIG. 4, normally the straight portion 42 will be at an angle of approximately 90° with respect to S shaped first end 30. Various mounting brackets would be attached to straight portion 42 to accommodate different manufacturers' rod holders.

The bracket of the subject invention may also be used with a marine cleat which is attached to other surfaces in addition to the deck of a boat, such as, for example, a dock.

Applicant has thus provided a novel bracket for supporting accessories with one end of the bracket being configured for engagement with a standard marine cleat. While a Z shaped or S shaped configurations are the preferred configurations, other configurations which are engagable with a marine cleat may also be utilized.

From the foregoing description of the preferred embodiment of the invention, it will be apparent that many modifications may be made therein. It should be understood, however, that this embodiment of the invention is an exemplification of the invention only and that the invention is not limited thereto. It is to be understood, therefore, that it is intended in the appended claims to cover all modifications as fall within the true spirit and scope of the invention.

What is claimed is:

1. A bracket in combination with a marine cleat comprising:
   a rod; said rod having a first end and a second end;
   said first end being formed into a configuration for engagement with said marine cleat, wherein said rod is secured to said marine cleat;
   said second end adapted to receive an accessory;
   the configuration of said first end is Z shaped.

2. A bracket as set forth in claim 1, wherein said Z shaped first end has first and second substantially parallel legs and a middle leg; said middle leg diagonally connecting said first and second legs.

3. A bracket as set forth in claim 2, wherein said marine cleat is adapted to be attached to a surface; the cleat includes a bar which is adapted to be elevated from the surface; the bar has a first overhang end and a second overhang end and an opening; when said first end of the bracket is engaged with said marine cleat, a portion of the first leg is received under the first overhang end, a portion of the second leg is received under the second overhang end and a portion of the middle leg is received in the opening.

4. A bracket as set forth in claim 3, wherein at least said second leg is adapted to make contact with the surface.

5. A bracket as set forth in claim 4, wherein said middle leg and said first leg are joined together by a first bend; said first bend adapted to make contact with the surface.

6. A bracket as set forth in claim 3, wherein said second end of said rod includes a substantially straight portion; said straight portion being connected to said second leg at an angle greater than 90°.

7. A bracket as set forth in claim 1, wherein said second end of said rod includes a substantially straight portion connected to said first end; said straight portion projecting away from said first end at an angle greater than 90°.

8. A bracket as set forth in claim 1, wherein the accessory is a lantern; said second end of said rod having a loop for holding the lantern.

9. A bracket in combination with a marine cleat comprising:
   a rod; said rod having a first end and a second end;
   said first end being formed into a configuration for engagement with said marine cleat, wherein said rod is secured to said marine cleat;
   said first end having first and second legs and a middle leg; said middle leg diagonally connecting said first leg and said second leg;
   said second end adapted to receive an accessory;
   the configuration of said first end is Z shaped.

10. A bracket as set forth in claim 9, wherein said marine cleat is adapted to be attached to a surface; said marine cleat includes a bar which is adapted to be elevated from the surface; the bar having a first overhang end and a second overhang end and an opening; when the first end of the bracket is engaged with said marine cleat, a portion of the first leg is received under the first overhang end, a portion of the second leg is received under the second overhang end and a portion of the middle leg is received in the opening.

11. An apparatus for supporting an accessory comprising:
   a rod; said rod having a first end and a second end;
   a marine cleat;
   said first end being formed into a configuration for engagement with said marine cleat, wherein said rod is secured to said marine cleat;
   said second end adapted to receive an accessory;
   the configuration of said first end is Z shaped.

12. An apparatus as set forth in claim 11, wherein said marine cleat is attached to a surface; said marine cleat includes a bar which is elevated from the surface; said bar having a first overhang end and a second overhang end and an opening; when said first end of said rod is engaged with said marine cleat, a portion of said first leg is received under said first overhang end, a portion of said second leg is received under said second overhang end and a portion of said middle leg is received in said opening.

13. A bracket in combination with a marine cleat comprising:
   a rod; said rod having a first end and a second end;
   said first end being formed into a configuration for engagement with said marine cleat, wherein said rod is secured to said marine cleat;
   said second end adapted to receive an accessory;
   said first end being configured in a Z shape; said Z shaped first end having first and second parallel legs and a middle leg; said middle leg diagonally connecting said first and second legs;
   said marine cleat includes a bar adapted to be elevated from a marine cleat mounting surface;
   the bar having a first overhang end and a second overhang end and an opening;
   when said first end of said bracket is engaged with said marine cleat, a portion of said first leg is received under the first overhang end, a portion of said second leg is received under the second overhang, and a portion of said middle leg is received in the opening;
   said second leg is adapted to make contact with the surface;
   said middle leg and the second leg being joined together by a first bend;
   said first bend is adapted to make contact with the surface;
   said second end of said rod including a substantially straight portion connected to the first end; said straight portion projecting away from the first end at an angle greater than 90°;
   said second end including a hook; said hook adapted to receive an accessory.

* * * * *